Nov. 6, 1923.	1,473,565
K. F. KONING
WHEEL TIRE
Filed March 21, 1923
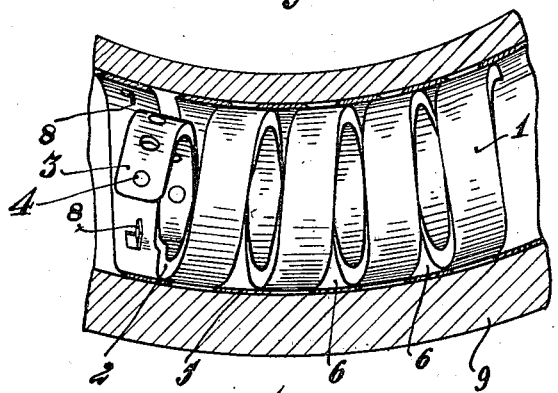
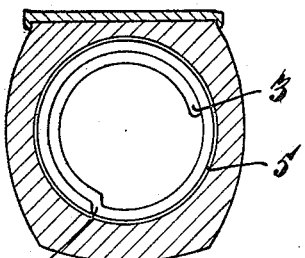
Inventor
K. F. Koning Patented Nov. 6, 1923.

1,473,565

UNITED STATES PATENT OFFICE.

KLAAS FREDERIK KONING, OF THE HAGUE, NETHERLANDS.

WHEEL TIRE.

Application filed March 21, 1923. Serial No. 626,633.

*To all whom it may concern:*

Be it known that I, KLAAS FREDERIK KONING, a subject of the Queen of the Netherlands, and residing at The Hague, Schenkstraat 238, the Netherlands, have invented certain new and useful Improvements in Wheel Tires, of which the following is a specification.

The present invention relates to wheel tires of the type in which an air tube is dispensed with and in which a rubber outer tire surrounds a helically wound metal spring.

In tires of this type the resiliency is almost entirely furnished by a single metal helical spring or by two springs helically wound in opposite direction and disposed the one inside the other, the rubber outer tire serving merely as a protecting and closing means.

According to the invention the resiliency and the bearing capacity are furnished by a rubber outer tire together with a helically wound metal spring between which and the rubber outer tire a metal closing spring is arranged, which is helically wound in the same sense as the inner spring and which is provided at certain distances with portions inwardly projecting between the windings of the inner spring. These projecting portions are preferably constituted by lips stamped out of the material of the closing spring.

The closing spring may be made thin and will follow the movements of the rubber outer tire so that the friction arises exclusively or at least mainly between the two metal springs. The invention will be more fully understood with reference to the accompanying drawing illustrating it by way of example.

Fig. 1 is a longitudinal section and

Fig. 2 is a cross section of a tire according to the invention.

Fig. 3 shows a portion of the closing spring in perspective.

The helically wound inner spring 1, which is made of sheet steel or other spring metal is shaped at one end so as to form an abutment 2 for the other end, the former end being shaped at 3 according to the inner circumference of the other end and being provided with holes 4 for connecting the two ends e. g. by a few bolts.

The said inner spring is surrounded by a thinner closing spring 5, whereby the interstices 6 between the windings of the inner spring are overlapped or closed. The closing spring fits with its preferably bevelled edges 7 accurately upon the inner spring and is provided at the required distances with stamped out lips 8, projecting inwardly between the windings of the inner spring and keeping the spring in the correct relative position without interfering with the spring-action itself.

The closing spring is made of relatively thin steel or other spring metal, so that it can displace itself readily with the material (rubber) of the outer tire 9. The friction-surface is thus formed by the outer surface of the inner spring and the inner surface of the closing spring.

The closing spring enables further to make the rubber tire by molding the rubber in soft condition around the said spring, which is then embedded therein. The helical interstices of the closing spring, eventually also the small apertures due to the stamping out of the lips, may if desired be sealed up with a mixture of graphite, and starch paste and gum or other non-oil-containing hardening and thereupon easily pulverizing materials so that the rubber, to be molded around the springs, cannot penetrate between the windings of the closing spring.

As soon as a wheel tire, mounted on a wheel, is in use the graphite powder pulverizes by the shifting of the closing spring so that the inner surface of the rubber tire is lubricated for an indefinite time.

The above mentioned molding of the rubber in soft condition around the covered inner spring may e. g., be effected by first centering the spring with respect to the outer rim by means of rubber pieces which are inserted with the required initial strain between the spring and this rim. The rubber pieces are then embedded in the enveloping rubber.

Having now particularly described and ascertained the nature of my said invention and the manner in which it is to be performed, what I claim as new and desire to secure by Letters Patent is:

1. A wheel tire without air tube comprising a rubber outer tire surrounding a helically wound metal spring, a closing spring between the outer tire and the helical spring and helically wound in the same sense and provided at certain distances apart with portions inwardly projecting between the windings of the inner spring.

2. A wheel tire without air tube comprising a rubber outer tire surrounding a helically wound metal spring, a closing spring between the outer tire and the helical spring and helically wound in the same sense and provided with lips stamped out of the material of the closing spring and inwardly projecting between the windings of the inner spring.

In testimony whereof I affix my signature.

KLAAS FREDERIK KONING.